March 22, 1927.
G. NIGRO
1,621,997
BUMPER FOR AUTOMOBILES
Filed May 27, 1926
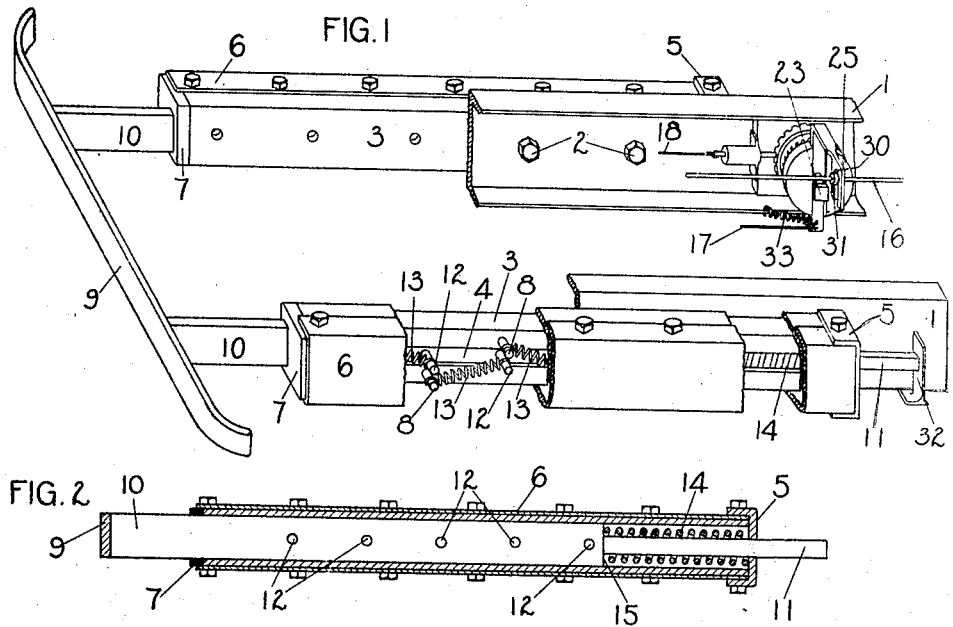
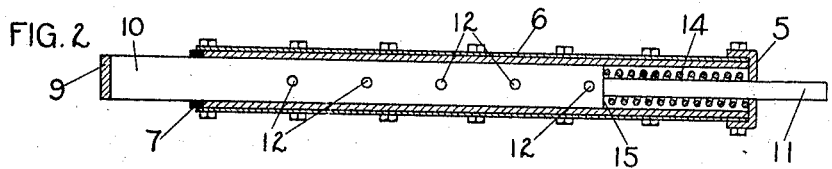
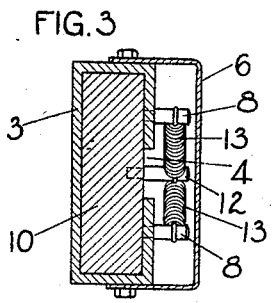
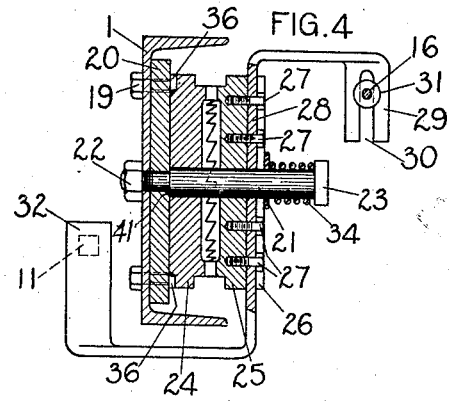
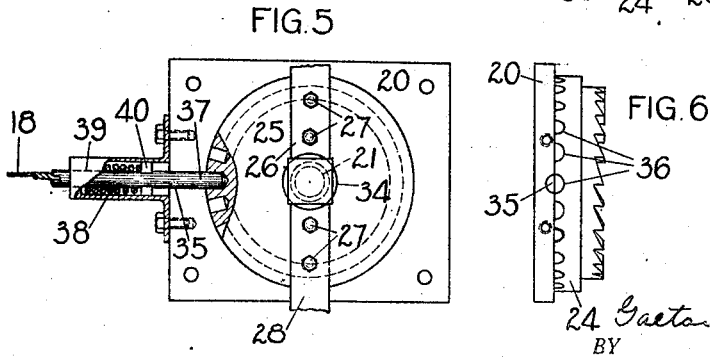
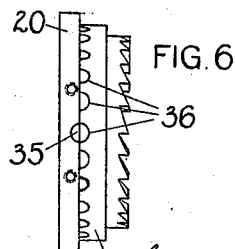
INVENTOR.
Gaetano Nigro,
BY Frank A. Cutter,
ATTORNEY.

Patented Mar. 22, 1927.

1,621,997

UNITED STATES PATENT OFFICE.

GAETANO NIGRO, OF THOMPSONVILLE, CONNECTICUT.

BUMPER FOR AUTOMOBILES.

Application filed May 27, 1926. Serial No. 111,975.

My invention relates to improvements in devices designed to be located at the front ends of automobiles for the purpose of receiving impacts and protecting other parts of the machines from the force thereof, in the event of headon collisions, and consists generally of certain peculiar casings adapted to be rigidly attached to the side beams of the frame or chassis of an automobile, bars or plungers slidingly arranged in said casings, and provided at their front ends with a cross-bar, expansion and contraction springs for said plungers, and safety mechanisms or devices for setting the brakes of the machine and shutting off the fuel supply from the engine, which devices have operating parts located in the paths of said plungers, and include resetting means, together with such other parts and members as may be necessary or desirable in order to render the bumper complete and serviceable in every respect, all as hereinafter set forth.

The safety devices mentioned above are auxiliary elements which may be omitted without affecting in any way the efficiency of the bumper as an impact-receiving element; nevertheless, I prefer to add said devices and thereby utilize certain inherent characteristics of the action of the bumper proper, which otherwise would be lost or wasted, to the end that a much greater degree of safety and security or protection is obtained from damage and danger.

One object of my invention is to produce a comparatively simple and inexpensive appliance, which can readily be attached to the chassis of an automobile, and when so attached, is capable of yielding under spring pressure, when meeting resistance at the front end, whereby breakage and damage are prevented or reduced to the minimum, and the shock and jar of collision are in great measure absorbed.

Another object is to provide, in connection with such a bumper, means for automatically setting the brakes and stopping the engine of the automobile in the event an object is struck by said bumper and the force of the blow forces the movable parts of the bumper rearwardly.

A further object is to provide convenient means for resetting the safety devices after they have been operated by the moving parts of the bumper.

Other objects and advantages will appear in the course of the following description.

I attain the objects and secure the advantages of my invention by the mechanism illustrated in the accompanying drawings, in which—

Figure 1 is an isometric view, with parts broken away, of a bumper which embodies a practical form of my invention; Fig. 2, a longitudinal, vertical section through one side portion or section of said bumper; Fig. 3, an enlarged, cross section through said section of the bumper; Fig. 4, an enlarged, central, vertical section through one of the safety devices; Fig. 5, a side elevation of said device, with the lock-pin case in partial section, and, Fig. 6, an edge view of certain of the members which constitute parts of said device.

Similar reference characters designate similar parts throughout the several views.

In Figs. 1 and 4 are shown at 1 fragmentary portions of the side beams of a chassis. In the present example the beams 1 consist of channel-irons.

Secured against the outer side of each beam 1, by any suitable means, such as bolts 2, is a casing 3 having in the outer side thereof, in the longitudinal center, a slot 4. The rear end of each casing 3 is closed by means of a perforated cap 5. Mounted on and secured to each case 3 over the slot 4 therein is a housing 6. Each cap 5 closes the rear end of the contiguous housing 6, as well as that of the contiguous casing 3, and the front end of said housing is closed by means of a perforated cap-plate 7 which is preferably made of rubber. Each cap-plate 7 also extends over the forward end of one of the casings 3 as well as over the corresponding end of the housing 6 mounted on the casing, and is secured to said casing and housing. Projecting from the outer side of each casing 3, alternately above and below the slot 4 therein, are pins 8.

A cross-bar 9 is rigidly attached to the front ends of two plungers 10 which are slidingly arranged in the casings 3, such bars passing through the cap-plates 7 at the forward end of said casings, and having projections or tail-pieces 11 at their rear terminals that pass through the perforations in the caps 5. Projecting forwardly from the outer side of each plunger 10 and extending through the slot 4 in its casing 3 are a plurality of pins 12. Each pin 12 is adjacent to one of the pins 8.

On each side of the bumper, each pin 8 and the next adjacent pin 12 have the opposite ends, respectively, of a spiral spring 13 attached thereto. The number of these springs and the pins to which they are attached may vary. A spiral spring 14 encircles each tail-piece 11 within the casing 3 in which said tail-piece is located, between the cap 5 on said casing and a shoulder 15 at the junction of said tail-piece with its plunger 10.

Normally the springs 13 are in contracted, and the springs 14 in expanded conditions, and the plungers 10 are held in their forward position and with the cross-bar 9 some distance from the end-plates 7, by said springs, when force is applied to the cross-bar 9 sufficient to overcome the resistance of the springs 13 and 14, the plungers 10 are actuated rearwardly in the casings 3 as far as said springs permit, or until said cross-bar is checked in its rearward movement by the end-plates 7. The rearward movement of the plungers 10 causes the springs 13 to expand and the springs 14 to contract. Upon the removal of the pressure from the cross-bar 9, the springs 13 and 14 immediately act to move the plungers 10 with said cross-bar forward into their initial and normal positions again, said first-named springs then contracting and said second-named springs expanding. As the plungers 10 move in their casings 3 the pins 12 travel in the slots 4.

By employing springs that simultaneously expand and contract when the plungers 10 are forced rearwardly, a uniform and balanced action is insured, and means is provided for absorbing completely in most instances the shock and jar of an impact between the cross-bar 9 and an object in front of the same. The resistance of the springs increases, of course, as the plungers 10 continue to move rearwardly.

In order to utilize my bumper as a medium for setting the vehicle brakes and stopping the engine at the time the bumper is operated, I provide mechanisms or devices to cooperate with or be operated by the tail-pieces 11. By providing two of these safety devices I reduce to the minimum the liability or possibility even of failure to stop the machine upon almost the instant the movable parts of the bumper are forced rearwardly by front-end collision. For the sake of convenience and since both safety devices are alike, I shall describe in detail but one of them.

In Fig. 1 is represented at 16 a rod which it is assumed is connected with the brakes of the machine, and adapted when moved forward to set said brakes; and at 17 is represented a wire which it is assumed is connected with the fuel supply to the engine, and adapted when actuated rearwardly to shut off such supply. In Figs. 1 and 5 is represented at 18 a resetting wire to which further reference will presently be made. The rod 16 and the wires 17 and 18, or the parts thereof that are herein shown, are located inside of one of the beams 1, and they are duplicated inside of the other beam.

Secured by means of bolts 19, or other means, to the inner face of the vertical part of either of the beams 1 is a rectangular plate 20. Passing through the center of the plate 20 and through the aforesaid vertical part of the beam 1 is an axial member in the form of a pin 21. The outer terminal portion of the pin 21, in front of said beam 1, is screw-threaded to receive a nut 22. The pin 21 has at the inner end a head 23. Loosely mounted on the pin 21 inside of the plate 20 is a clutch member 24, and loosely mounted on said pin inside of said clutch member is a second clutch member 25, said clutch members having teeth on their adjacent faces to interengage with each other. The pin 21 is turned down to form a shoulder 41 (Fig. 4), and nut 22 clamps the beam 1 and the plate 20 between itself and said shoulder whereby said pin is held against endwise movement. The clutch member 25 has a slot 26 in and extending across the full diameter of the inner face thereof, and received in said slot and secured to said member, by means of a plurality of bolts 27, is an operating bar 28. The pin 21 passes through the bar 28. The bar 28 normally stands upright, and at its upper end extends inwardly and then downwardly to form a lug 29 in which is a vertical slot 30 to receive the brake rod 16. Secured to the brake rod 16 directly in front of the lug 29 is a collar 31. Obviously, if the bar 28 be rocked on the pin 21 in the direction to swing the lug 29 forwardly, the collar 31 must be carried with said lug and takes with it the brake rod 16. The bar 28 at the bottom extends outwardly and then upwardly to form a lug 32 which is directly behind the tail-piece 11 on the same side with said lug. The lug 32 is retained in contact with the tail-piece 11, and said lug and the bar 28 with the lug 29 are maintained normally in an approximately vertical position by means of a spiral spring 33 that has one end secured to said bar near the bottom thereof and the other end secured to the adjacent beam 1 forward of said bar, as clearly shown in Fig. 1.

Since the wire 17 is attached to the bar 28 below the pin 21, said wire is drawn rearwardly when said bar is rocked by the tail-piece 11.

A spring 34 is interposed between the clutch member 25 and the pin head 23, and tends to force said clutch member, which is capable of moving laterally on the pin 21, toward the clutch member 24, and to retain the clutch-member teeth in engagement with each other.

In the horizontal diametrical center of the inner face of the plate 20, and opening through the front edge thereof, is a groove 35, and arranged at intervals in the outer face of the clutch member 24, and opening through the periphery thereof, are radial grooves 36, each of said grooves 35 and 36 being semi-circular in cross section, and approximately equal to one-half of the diameter of the horizontal lock pin 37 that is located in said first-named groove and adapted to enter any of said second-named grooves which may be located directly in front of the first-named groove—see Figs. 5 and 6. The construction and arrangement of parts are such that, normally the bar 28 is retained in an approximately vertical position, as previously observed, and, when said bar is so positioned and the teeth of the clutch members 24 and 25 are in full engagement, one of the grooves 36 in the clutch member 24 is positioned to form with the groove 35 a complete passage or opening to receive the inner-terminal portion of the pin 37, and said pin is in said opening and locks said clutch member 24 to the plate 20 and prevents the former from rotating. But upon drawing the pin 37 outwardly, against the resiliency of the spring 38, until said pin is clear of the clutch member 24, said member is released and free to rotate on the pin 21.

A case 39 is secured to the front edge of the plate 20, and the spring 38 and a portion of the pin 37 are located in said case, as shown in Fig. 5. The pin 37 extends from the groove 35 in the plate 20 into the case 39, and through the front end of said case, which end is perforated to accommodate said pin. The wire 18 has one end attached to the protruding terminal of the pin 37. That part of the pin 37 that is in the case 39 is provided with a cross-piece 40, and the spring 38 is interposed between the outer end of said case and said cross-piece, thus having a tendency to force said pin inwardly.

Upon the rearward movement of the plungers 10, each plunger tail-piece 11 in front of one of the lugs 32 forces said lug rearwardly, and thus causes the bar 28, with which said lug is connected to rock on its pin 21 and carry forward the companion lug 29, against the resiliency of the spring 33 attached to said bar, with the result that the brake rod 16 controlled by the bar is operated to set the brakes, and the wire 17 attached to the bar is operated to shut off the fuel supply from the engine. When the bar 28 is rocked on the pin 21 in the manner just explained, it carries with it the clutch member 25 to which said bar is rigidly attached, and, owing to the relative arrangement of the clutch-member teeth, and the fact that the clutch-member 24 is held against rotation by the pin 37, said first-named clutch member is forced inwardly on said pin, against the resiliency of the spring 34, the teeth of said first-named clutch member then riding over the teeth of said second-named clutch member. The slot 30 in the lug 29 is large enough to permit the bar 28 to move inwardly and outwardly, with the clutch member 25 on the pin 21, without interference from the brake rod 16.

At the end of the operations just described, the bar 28 is disposed obliquely and held in such position by the now intermeshing clutch-member teeth, and it is necessary to reset said bar, or to restore it to an approximately upright position. To reset the bar 28, the wire 18 is pulled to withdraw the pin 37, against the resiliency of the spring 38, from the groove 36 in which said pin is located, when the spring 33 acts to rock said bar into an approximately vertical position again, the bar and clutch members 25 and 24 all partially rotating on the pin 21. When the bar 28 is once more erect and the lug 32 strikes the tail-piece 11 in front, it being assumed that said tail-piece is now in its forward position, the wire 18 is released and the spring 38 actuates the pin 37 into the groove 36 that has arrived in position to form with the groove 35 a complete opening for said pin. The resetting of the safety device releases the brake rod 16 and the shut-off wire 17 and enables them to assume their inactive positions, and said device is left in readiness for a repetition of the operations previously described.

More or less change in the shape, size, construction, and arrangement of some or all of the parts of this bumper, in addition to those hereinbefore specifically pointed out, may be made without departing from the spirit of my invention or exceeding the scope of what is claimed.

The bumper, without the safety devices, may be applied to the rear as well as to the front end of an automobile, either or both.

What I claim as my invention, and desire to secure by Letters Patent, is—

1. The combination, in a bumper for automobiles, with casings adapted to be attached to a chassis, plungers slidingly arranged in said casings, and a cross-bar at the front ends of said plungers, of springs laterally disposed relative to said casings and said plungers, and adapted when expanded to act on said plungers to force them forwardly, and springs axially disposed relative to said plungers, and adapted when contracted also to act on said plungers to force them forwardly.

2. The combination, in a bumper for automobiles, with casings adapted to be attached to a chassis, said casings having longitudinal slots therein and capped rear ends, and being equipped with pins adjacent to said slots, of plungers slidingly arranged in said casings and equipped with pins that project into said slots, a cross-bar at the front ends of said plungers, springs each having one end attached to one of the casing pins and the other end attached to one of the plunger pins, and springs interposed between the rear ends of said casings and the rear ends of said plungers.

3. The combination, in a bumper for automobiles, with casings adapted to be attached to a chassis, said casings having longitudinal slots therein and capped rear ends, and being equipped with pins adjacent to said slots, and housings over the slotted sides of said casings, of plungers slidingly arranged in said casings and equipped with pins that project into said slots, a cross-bar at the front ends of said plungers, springs each having one end attached to one of the casing pins and the other end attached to one of the plunger pins, said springs being in said housings, and springs interposed between the rear ends of said casings and the rear ends of said plungers.

4. The combination, in a bumper for automobiles, with casings adapted to be attached to a chassis, said casings having longitudinal slots therein and capped rear ends, and being equipped with pins adjacent to said slots, housings over the slotted sides of said casings, and perforated end plates attached to the front ends of said casings and housings, of plungers slidingly arranged in said casings and end plates and equipped with pins that project into said slots, a cross-bar at the front ends of said plungers, springs each having one end attached to one of the casing pins and the other end attached to one of the plunger pins, said springs being in said housings, and springs interposed between the rear ends of said casings and the rear ends of said plungers.

5. The combination, in a bumper for automobiles, with casings adapted to be attached to a chassis, said casings having longitudinal slots therein and perforated caps at the rear ends, and being equipped with pins adjacent to said slots, of plungers slidingly arranged in said casings and having tailpieces which extend into the perforations in said caps, and being equipped with pins that project into said slots, a cross-bar at the front ends of said plungers, springs each having one end attached to one of the casing pins and the other end attached to one of the plunger pins, and springs interposed between the rear ends of said casings and rear end portions of said plungers.

6. The combination, with an automobile bumper comprising casings attachable to a chassis, and forwardly spring-pressed plungers extending through said casings, and provided at their front ends with a crossbar, of a plate also attachable to said chassis, an axial member supported by said plate, a clutch member mounted on said axial member, a second clutch member mounted on said axial member and being laterally movable thereon, said clutch members having inter-engaging teeth, a bar secured to said second clutch member, and having a lug in the path of a part at the rear end of one of said plungers, and a lug adapted to operate a brake rod, a spring arranged normally to retain said second clutch member with its teeth in engagement with the teeth of said first-named clutch member, yielding means normally to retain said bar with said first-named lug in operative position relative to said plunger rear-end part, and means to hold said first-named clutch member against rotation and release it for rotation.

7. The combination, with an automobile bumper comprising casings attachable to a chassis and forwardly spring-pressed plungers extending through said casings, and provided at their front end with a crossbar, of a plate also attachable to said chassis, an axial member supported by said plate, a clutch member mounted on said axial member, a second clutch member mounted on said axial member and being laterally movable thereon, said clutch members having interengaging teeth, a bar secured to said second clutch member, and having a lug in the path of a part at the rear end of one of said plungers, and a lug slotted to receive a brake rod and adapted to engage a collar on said rod, a spring arranged normally to retain said second clutch member with its teeth in engagement with the teeth of said first-named clutch member, yielding means normally to retain said bar with said first-named lug in operative position relative to said plunger rear-end part, and means to hold said first-named clutch member against rotation and release it for rotation.

8. The combination, with an automobile bumper comprising casings attachable to a chassis, and forwardly spring-pressed plungers extending through said casings, and provided at their front ends with a crossbar, of a plate also attachable to said chassis, and having therein a groove, an axial member supported by said plate, a clutch member mounted on said axial member, and having therein grooves adapted to be located individually in operative position relative to said first-named groove, a spring-pressed pin arranged in said first-named groove to enter a passage formed by said first-named groove and any of said second-named grooves to lock said clutch member to said plate, a second clutch member mounted on said axial member, said clutch members having interengaging teeth, a brake-setting and a fuel shut-off bar secured to said second clutch member, said bar having a lug in the path of a part at the rear end of one of said plungers, a spring arranged normally to retain said second clutch member with its teeth in engagement with the teeth of said first-named clutch member, and yielding means normally to retain said bar with said first-named lug in operative position relative to said plunger rear-end part.

GAETANO NIGRO.